(12) United States Patent
Mori

(10) Patent No.: US 9,919,387 B2
(45) Date of Patent: Mar. 20, 2018

(54) MACHINING APPARATUS

(71) Applicant: Cutland Japan Co., Ltd., Tokyo (JP)

(72) Inventor: Kenichi Mori, Kawasaki (JP)

(73) Assignee: Cutland Japan Co., Ltd., Tokyo (JP)

( * ) Notice: Subject to any disclaimer, the term of this patent is extended or adjusted under 35 U.S.C. 154(b) by 164 days.

(21) Appl. No.: 15/182,866

(22) Filed: Jun. 15, 2016

(65) Prior Publication Data

US 2016/0377160 A1    Dec. 29, 2016

(30) Foreign Application Priority Data

Jun. 24, 2015 (JP) ................... 2015-126280
Nov. 20, 2015 (JP) ................... 2015-227281

(51) Int. Cl.
| | |
|---|---|
| *B23B 5/16* | (2006.01) |
| *B23K 37/02* | (2006.01) |
| *B23B 5/00* | (2006.01) |
| *B23K 101/10* | (2006.01) |

(52) U.S. Cl.
CPC ............ *B23K 37/0276* (2013.01); *B23B 5/00* (2013.01); *B23B 5/16* (2013.01); *B23B 5/163* (2013.01); *B23K 37/0247* (2013.01); *B23K 2201/10* (2013.01)

(58) Field of Classification Search
None
See application file for complete search history.

(56) References Cited

U.S. PATENT DOCUMENTS

| 7,320,268 | B2 * | 1/2008 | Kawashima | .............. | B23B 3/26 |
| | | | | | 82/113 |
| 8,584,558 | B2 * | 11/2013 | Phillips, II | ................ | B23B 3/26 |
| | | | | | 82/113 |
| 9,138,808 | B2 * | 9/2015 | Walton | ....................... | B23B 5/14 |
| 2014/0260840 | A1 * | 9/2014 | Mori | ........................ | B23B 3/26 |
| | | | | | 82/113 |
| 2017/0056998 | A1 * | 3/2017 | Mori | .................... | B23K 9/0286 |

FOREIGN PATENT DOCUMENTS

| JP | 53-080881 | 7/1978 |
| JP | 62-287907 | 12/1987 |
| JP | 01-153844 | 6/1989 |
| JP | 2003-117720 | 4/2003 |

* cited by examiner

*Primary Examiner* — Dirk Wright
(74) *Attorney, Agent, or Firm* — Rankin, Hill & Clark LLP

(57) ABSTRACT

A differential device including a planetary gear mechanism having a sub-gear, an annular gear and a planetary gear is more compact than a differential gear using a bevel gear mechanism. Since revolution torque of the planetary gear is transmitted to a free gear, and torque from the main gear is reduced to be transmitted, the differential device can use a small-sized drive unit in comparison with a conventional one. Hence, a machining apparatus including such a differential device is also compact. If the machining apparatus has three drive units, a pair of ring gears, first and second power transmission shafts, a radial movement mechanism and an axial movement mechanism, a tool holder, namely, a tool coupled to the radial movement mechanism and the axial movement mechanism, can be freely moved in axial and radial directions with respect to the pipe.

12 Claims, 8 Drawing Sheets

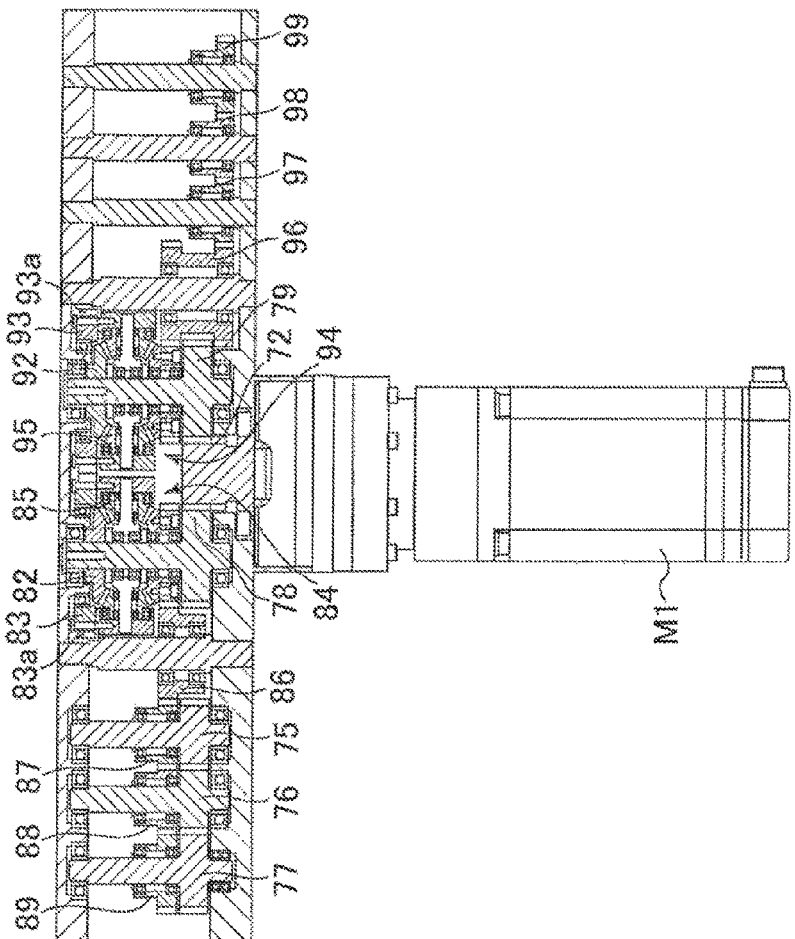
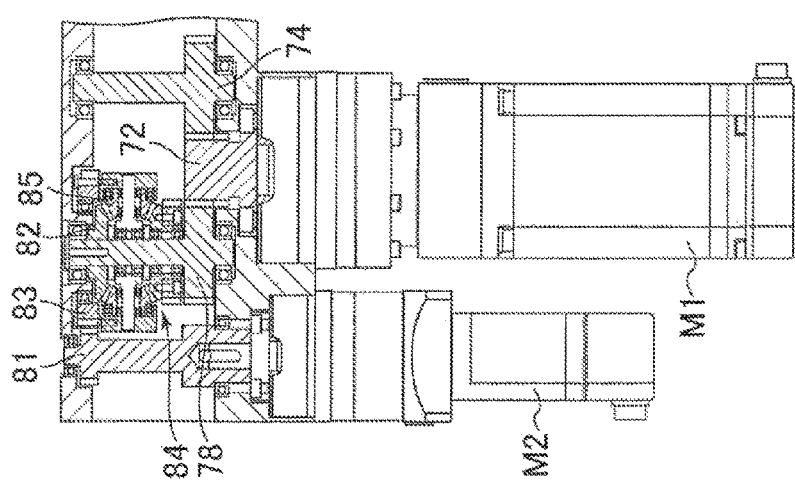

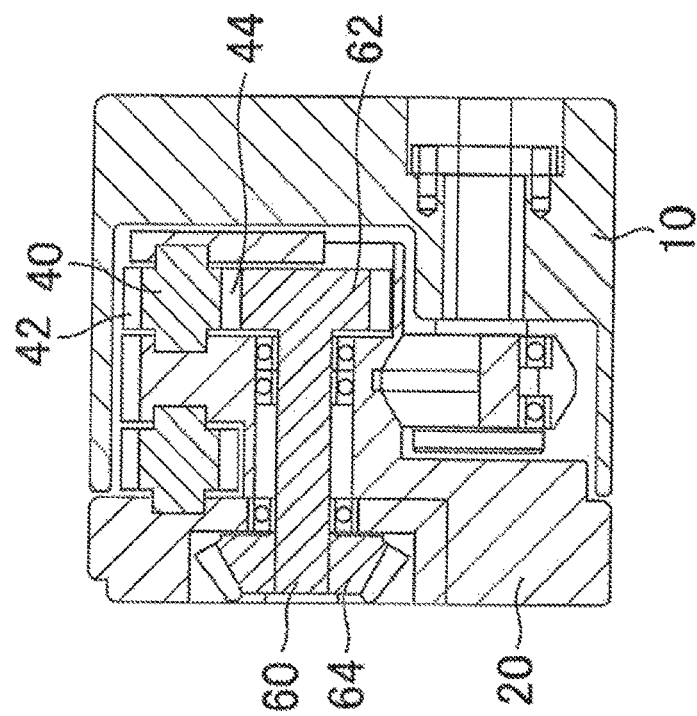
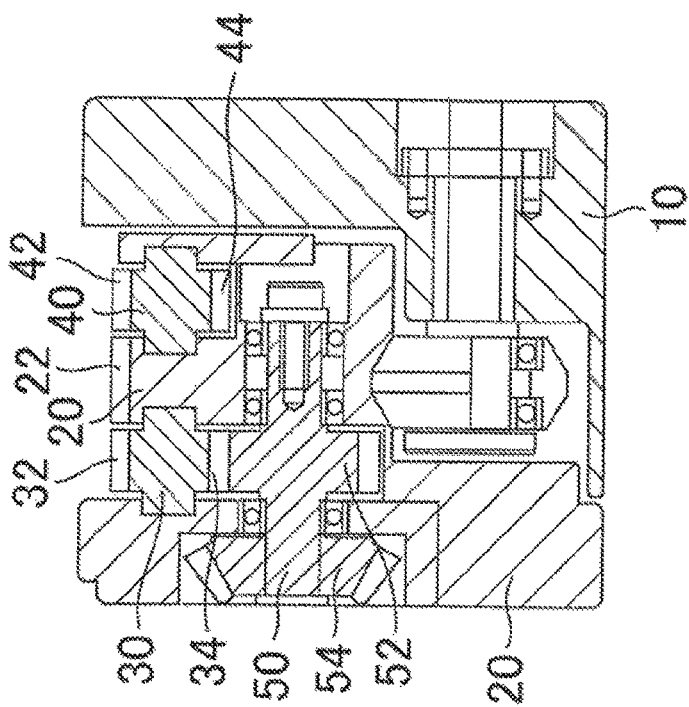
FIG. 4(a)
FIG. 4(b)

MACHINING APPARATUS

FIELD OF THE INVENTION

The present disclosure relates to a machining apparatus for machining (including welding) of a workpiece, or specifically piping (pipe), using a differential device that outputs torque to a plurality of objects by driving one drive unit, and from this state, generates a differential motion to the torque to the plurality of objects by driving another drive unit. Hereinafter, such differential device may be referred to simply as "differential device", and such apparatus for machining simply as "machining apparatus"

DESCRIPTION OF RELATED ART

An example of a machining apparatus using a differential device is disclosed in Japanese Patent Laid-Open No. 2014-172134.

The machining apparatus disclosed in Japanese Patent Laid-Open No. 2014-172134 is composed of an annular housing, an annular face plate, a ring gear, a tool holder, the differential device and two drive units (motors). This machining apparatus, configured to sandwich a pipe with a plurality of clamps arranged symmetrically on the housing, is basically fixed to an outside of the pipe. The face plate and the ring gear are rotatably supported with respect to the housing. The tool holder for holding a tool is mounted on a surface of the face plate on the opposite side of the housing. Incidentally, the tool referred to in Japanese Patent Laid-Open No. 2014-172134 is a turning tool, which is a cutter used for edge-preparation and cutting of the pipe.

This face plate of the machining apparatus has a face plate gear, which serves as an external gear. The ring gear has an outer peripheral gear, which serves as an external gear, and an inner peripheral gear, which serves as an internal gear. The face plate and the ring gear are relatively rotatably installed with respect to the housing. The inner peripheral gear of the ring gear is engaged with a power transmission input gear installed on a power transmission shaft. The power transmission shaft is rotatably supported inside the face plate and includes a power transmission output gear exposed to the surface of the face plate. The power transmission output gear engages with a tool feeding gear included by the tool holder, thereby rotating the tool feeding gear and accordingly moves, via a screw feed mechanism and the like, in a direction in which the tool approaches to or departing from the pipe.

The machining apparatus disclosed in Japanese Patent Laid-Open No. 2014-172134 includes two motors, namely, a main motor and a sub-motor, which are coupled to the differential device. The differential device transmits torque from the motors to the face plate and the ring gear. Specifically, when the differential device affects only the main motor to be driven, torque at a same speed in a same rotational direction can be transmitted to the face plate and the ring gear. If the sub-motor is driven in this state, rotational speed of torque transmitted to the ring gear can be changed arbitrarily. When rotational speed differs between the face plate and the ring gear, torque is transmitted to the power transmission input gear from the inner peripheral gear of the ring gear, thereby rotating the power transmission shaft. Consequently, an operation of the main motor and the sub-motor enables the pipe to approach to or departing from the pipe.

As above described, according to the machining apparatus disclosed in Japanese Patent Laid-Open No. 2014-172134, moving, stopping, moving speed and moving distance of the tool can be freely controlled only by controlling the rotational speed and direction of the main motor and the sub-motor coupled to the differential device.

However, the moving, stopping, moving speed and moving distance of the tool can be controlled in one specific direction. Specifically, on one hand, in the case of such a machining apparatus for cutting the pipe as illustrated in FIG. 1 of Japanese Patent Laid-Open No. 2014-172134, control can be performed only in the radial direction of the pipe, and on the other hand, in such a machining apparatus for edge preparation as illustrated in FIG. 2 of Japanese Patent Laid-Open No. 2014-172134, control can be performed only in the axial direction of the pipe.

Namely, in the case of the machining apparatus for cutting the pipe, an axial position of the tool with respect to the pipe is generally determined on the basis of an installation position of the machining apparatus, and thus a change of the axial position of the tool is disallowed after installation of the machining apparatus. Also, in the case of the machining apparatus for edge preparation, a radial position of the tool with respect to the pipe is determined even at the present time in a manner that an operator operates a handle manually to move the tool to an arbitrary position.

Moreover, in the case of the differential device disclosed in Japanese Patent Laid-Open No. 2014-172134, in general, when only the main motor is driven, torque at the same speed as torque transmitted from the main motor is output to the face plate and the ring gear. Due to this, a motor with a sufficient capacity for rotating the face plate and the ring gear needs to be used, and therefore when using a small-sized motor, a separate speed-reducing mechanism needs to be incorporated. Moreover, particularly when a bevel gear is used in the differential device, a gear mechanism requires a large space, and thus the apparatus is likely to be large.

BRIEF DESCRIPTION

In order to solve the problems associated with the above-described prior art, an object of the present disclosure is to provide a machining apparatus using a differential device that can use a more compact and small-sized drive unit than a conventional one. Another object of the present disclosure is to provide a machining apparatus that can automatically move a tool in the axial and radial directions with respect to a pipe to be processed.

According to one aspect, a machining apparatus includes a housing, a face plate, a ring gear, a power transmission axis, a torque using means and a differential device. The face plate having a face plate gear and the ring gear are rotatably installed with respect to the housing. The power transmission shaft is rotatably supported to the face plate, and includes a power transmission input gear to which torque is transmitted from the ring gear and a power transmission output gear for transmitting torque from the power transmission input gear. To the torque using means, torque is transmitted from the power transmission output gear. The differential device is mounted to the housing, and includes a first drive unit and a second drive unit, a main gear, a sub-gear, an annular gear, a planetary gear and a free gear. To the main gear, torque is transmitted from the first drive unit. The sub-gear interlocks with the main gear. To the annular gear having internal teeth, torque is transmitted from the second drive unit. The planetary gear engages with the sub-gear and the internal teeth of the annular gear, and revolves around the sub-gear and a shaft of the annular gear. To the free gear, revolution torque of the planetary gear is transmitted. When the annular gear is fixed and the main gear rotates, the face plate and the ring gear rotate at a same speed in a same direction.

The machining apparatus can be configured to include an annular housing, a annular face plate, a pair of annular ring gears, a clamp, a first power transmission shaft, a second power transmission shaft, a radial movement mechanism, an axial movement mechanism, a tool holder, a first drive unit, a second drive unit and a third drive unit. The annular face plate having a face plate gear and the pair of annular ring gears having an outer peripheral gear and an inner peripheral gear are rotatably installed with respect to the housing. The clamp is mounted to the housing, and fixes the housing and the ring gear to an outer diameter side of the pipe, which serves as a workpiece. The first transmission shaft is rotatably supported to the face plate, and includes a first power transmission input gear to which torque is transmitted from one of the ring gears and a first power transmission output gear for transmitting the torque from the first power transmission input gear. The second transmission shaft is rotatably supported to the face plate, and includes a second power transmission input gear to which torque is transmitted from the other of the ring gears and a second power transmission output gear for transmitting the torque from the second power transmission input gear. The radial movement mechanism converts the torque from the first power transmission output gear into a linear movement in the radial direction of the face plate. The axial movement mechanism is installed to the radial direction movement mechanism, and converts the torque from the second power transmission output gear into a linear movement in the axial direction of the face plate. The tool holder is coupled to the axial movement mechanism and mounted on a face plate side thereof. The first drive unit transmits torque to the face plate. The second drive unit transmits torque to one of the pair of ring gears. And, the third drive unit transmits torque to the other of the pair of ring gears.

The machining apparatus including the differential device can output torque from two places, namely, the main gear and the free gear when the first drive unit is driven, and from this state, when the second drive unit is driven, rotational speed of the free gear can be controlled freely. Further, as revolution torque of the planetary gear is transmitted to the free gear, reduced torque is transmitted from the main gear. Thus, by means of a smaller-sized drive unit in comparison with a conventional one, a sufficient capacity of torque can be output from the free gear. In addition, due to the configuration including a planetary gear mechanism composed of the sub-gear, the annular gear and the planetary gear, the machining apparatus may be configured to include a compact differential device in the axial direction of the sub-gear.

Further, if the machining apparatus is configured to include a main torque output gear engaged with the main gear so that if the main torque output gear and the free gear can rotate at a same speed when the annular gear is fixed and the main gear rotates, torque from the main gear can be reduced and torque at a same speed can be output from the main torque output gear and the free gear.

If the machining apparatus is configured to include another sub-gear, another annular gear, another planetary gear and another free gear, and another drive unit, whereby the drive units transmit torque to each of the annular gears, the machining apparatus can output torque to a plurality of objects.

The machining apparatus including the differential device can use a more compact and small-sized drive unit in comparison with a conventional one.

Furthermore, if the machining apparatus is configured to include the three drive units, the pair of ring gears, the first and second power transmission shafts, the radial movement mechanism and the axial movement mechanism, the tool holder, namely, the tool coupled to the radial movement mechanism and the axial movement mechanism can be moved automatically in the axial and radial directions with respect to the pipe.

Furthermore, if the machining apparatus is configured to include the differential device, then the face plate gear and the pair of ring gears can be driven at a same speed in a same rotational direction by stopping the second drive unit and the third drive unit and driving the first drive unit. Also, from this state, if the second drive unit and the third drive unit are driven to control rotational speeds and rotational directions thereof, moving and stopping, moving speed and distance of the tool can be freely controlled in the axial direction and the radial direction with respect to the pipe.

Further, if the machining apparatus is configured so that the face plate is rotatably supported to the housing and the pair of ring gears are relatively rotatably installed with respect to the face plate, a single support mechanism can rotatably support the face plate and the pair of ring gears with respect to the housing, along with contributing to reduction of parts count.

BRIEF DESCRIPTION OF THE DRAWINGS

FIG. 2(a) is a cross-sectional view taken along the line 2(a)-2(a) of FIG. 1(a), and FIG. 2(b) is a cross-sectional view taken along the line 2(b)-2(b) of FIG. 1(a);

FIG. 4(a) is a cross-sectional view taken along the line 4(a)-4(a) of FIG. 1(a), and FIG. 4(b) is a cross-sectional view taken along the line 4(b)-4(b) of FIG. 1(a);

DETAILED DESCRIPTION

Following is a description by way of example only with reference to FIGS. 1 to 8 of embodiments of the present disclosure. Still, the present disclosure is not limited to these embodiments.

Figure 1B:
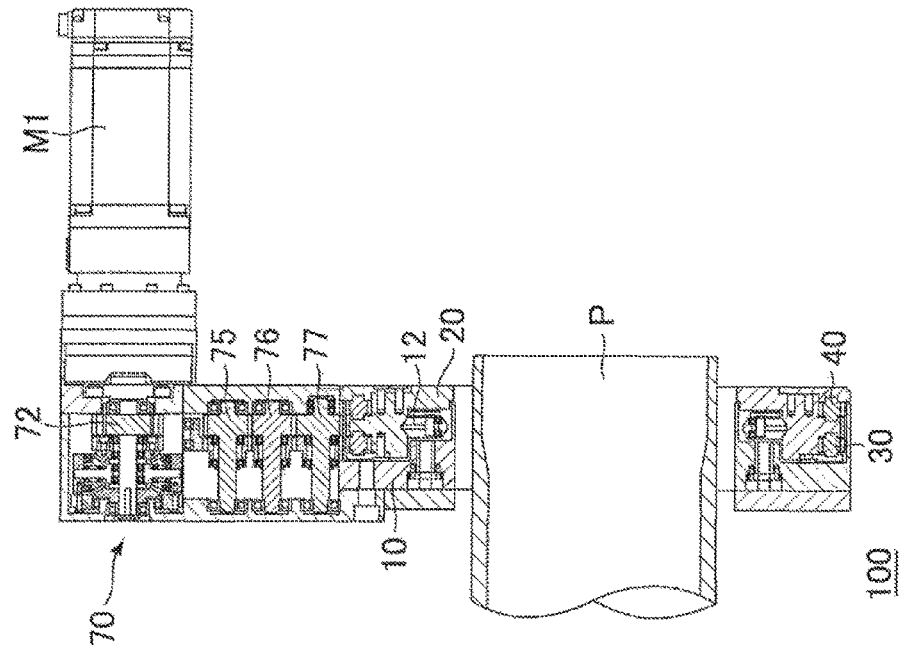
FIG. 1(b) is a longitudinal sectional view viewed from the side thereof.
Figure 1A:
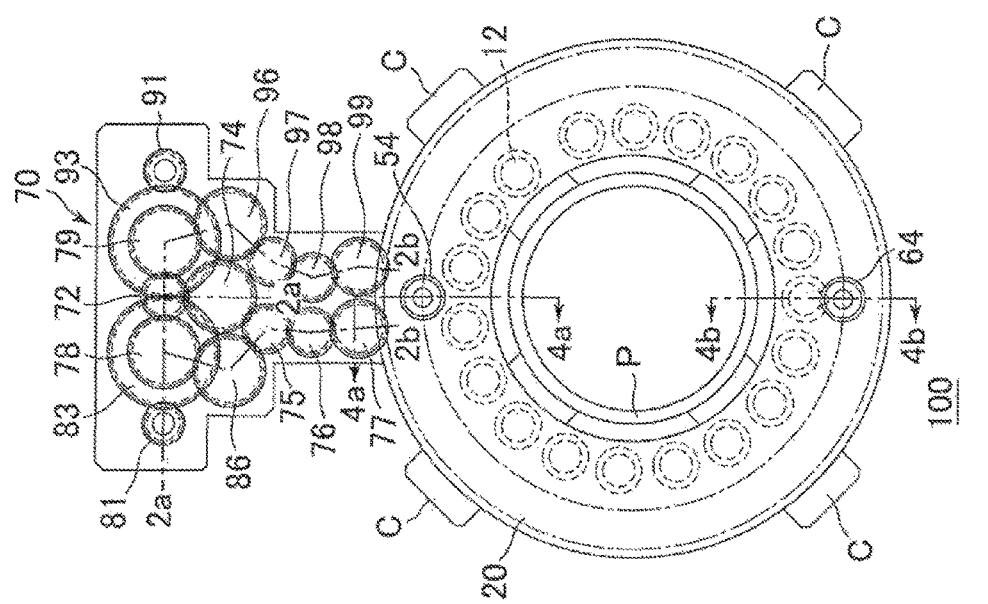
FIG. 1(a) is a front elevational view illustrating a first embodiment.

As shown in FIGS. 1(a) and 1(b), a machining apparatus 100 of the present disclosure includes a housing 10, a face plate 20 and a differential device 70. The differential device 70 includes a motor M1, which serves as a first drive unit, a motor M2, which serves as a second drive unit and a motor M3, which serves as a third drive unit (see FIG. 5). Even without the differential device 70, torque of the motors M1 to M3 can be transmitted respectively to first and second ring gears 30, 40 and the face plate 20. However, the machining apparatus 100 may preferably include the differential device 70, as will be described later, enabling the face plate 20 and the first and second ring gears 30, 40 to rotate by driving the motor M1 only. For convenience, an illustration of the motors M1 to M3 is omitted in FIG. 1(a), and an illustration of the tool holder 110 (see FIG. 5) is omitted in FIGS. 1(a) and 1(b). While motor capacity of the motors M1, M2, M3 is not specifically limited, the motor capacity of the motors M2 and M3 may be smaller than that of the motor M1 as relatively larger torque is not required for rotating a planetary carrier or an annular gear, both of which will be described later.

The housing 10 and the face plate 20 are annular in shape as shown in the figures. A pair of clamps C, provided on the housing 10 symmetrically in the radial direction, sandwiches an outer periphery of piping (pipe) P, whereby the machining apparatus 100 is basically fixed to an outer diameter side of the pipe P. A description of the clamp C is omitted as a well-known structure thereof may apply here.

The face plate 20 is rotatably supported with respect to the housing 10 by a plurality of rollers 12 installed to the housing 10. The first and second ring gears 30, 40 in annular shape are relatively rotatably fitted into both sides of the face plate 20 respectively. According to this configuration, non-necessity of a roller for rotatably supporting each of the first and second ring gears 30, 40 can reduce parts count proportionally. It is to be noted that the first and second ring gears 30, 40 may be arranged side by side on one side of the face plate 20, for example, in a manner that the first ring gear 30 is relatively rotatably fitted into the face plate 20 and the second ring gear 40 is relatively rotatably fitted into the first ring gear 30.

As will be detailed later, torque of the motor M1 is transmitted to the face plate 20, the first ring gear 30 and the second ring gear 40, and from this state, by driving the motors M2, M3 to control rotational speeds and rotational directions thereof, the rotational speed of the first ring gear 30 or the second ring gear 40 can be freely controlled. Also, when the first ring gear 30 rotates at a different speed with respect to the face plate 20, the first power transmission output gear 54 rotates, and when the second ring gear 40 rotates at a different speed with respect to the face plate 20, the second power transmission output gear 64 rotates.

The differential device 70 has a main gear 72 to which torque is transmitted from the motor M1. The torque transmitted to the main gear 72 is transmitted to main torque output gears 74, 75, 76, 77 in this order (see also FIG. 2). Since the main torque output gear 77 is engaged with the face plate gear 22 (see FIG. 4(a)) installed on an outer periphery of the face plate 20, as a result, the face plate 20 rotates due to driving of the motor M1.

As shown in FIG. 2(b), the main gear 72 is engaged with a first sub-torque input gear 78 and a second sub-torque input gear 79 in addition to with the main torque output gear 74 (see FIGS. 1(a) and 2(a)). Coaxially with the first sub-torque input gear 78 and the second sub-torque input gear 79, a first sub-gear 82 and a second sub-gear 92 are respectively installed so as to interlock respectively with the first sub-torque input gear 78 and the second sub-torque input gear 79 at a same speed in a same rotational direction. Incidentally, the first sub-gear 82 and the second sub-gear 92 are bevel gears.

Moreover, coaxially with the first sub-gear 82 and the second sub-gear 92, a first free gear 84 and a second free gear 94 are rotatably installed respectively. In detail, the first free gear 84 and the second free gear 94 respectively include an input bevel gear 84(a) and a second input bevel 94(a), and a first output spur gear 84(b) and a second output spur gear 94(b).

On the other hand, coaxially with the first sub-gear 82 and second sub-gear 92, a first planetary carrier 83 and a second planetary carrier 93 are installed respectively. To the first planetary carrier 83, the first sub-gear 82 and a plurality of first planetary gears 85 in engagement with the first input bevel gear 84(a) are installed rotatably. To the second planetary carrier 93, the second sub-gear 92 and a plurality of second planetary gears 95 in engagement with the second input bevel gear 94(a) are installed rotatably. While a single first planetery gear 85 and a single second planetary gear 95 function properly, the plurality thereof may be preferably provided from the viewpoint of strength.

To the first planetary carrier 83 and the second planetary carrier 93, a first planetary carrier gear 83a and a second planetary carrier gear 93a are installed respectively. The first planetary carrier gear 83a and the second planetary carrier gear 93a are engaged respectively with an M2 input gear 81 and an M3 input gear 91 to which torque is transmitted respectively from the motors M2 and M3 (see also FIG. 1(a)). Accordingly, driving of the motors M2, M3 can rotate the first planetary carrier 83 and the second planetary carrier 93 separately around a shaft of the first sub-gear 82 or the second sub-gear 92.

Torque transmitted to the first output spur gear 84(b) interlocking with the first input bevel gear 84(a) (see also FIG. 3) is transmitted to first sub-torque output gears 86, 87, 88, 89 in this order. Torque transmitted to the first output spur gear 94(b) interlocking with the first input bevel gear 94(a) (see also FIG. 3) is transmitted to second sub-torque output gears 96, 97, 98, 99 in this order. The first sub-torque output gear 89 is engaged with a second outer peripheral gear 42 (see FIG. 4(a)) installed on an outer periphery of the second ring gear 40. The second sub-torque output gear 99 is engaged with a first outer peripheral gear 32 (see FIG. 4(a)) installed on an outer periphery of the first ring gear 30.

Figure 3:
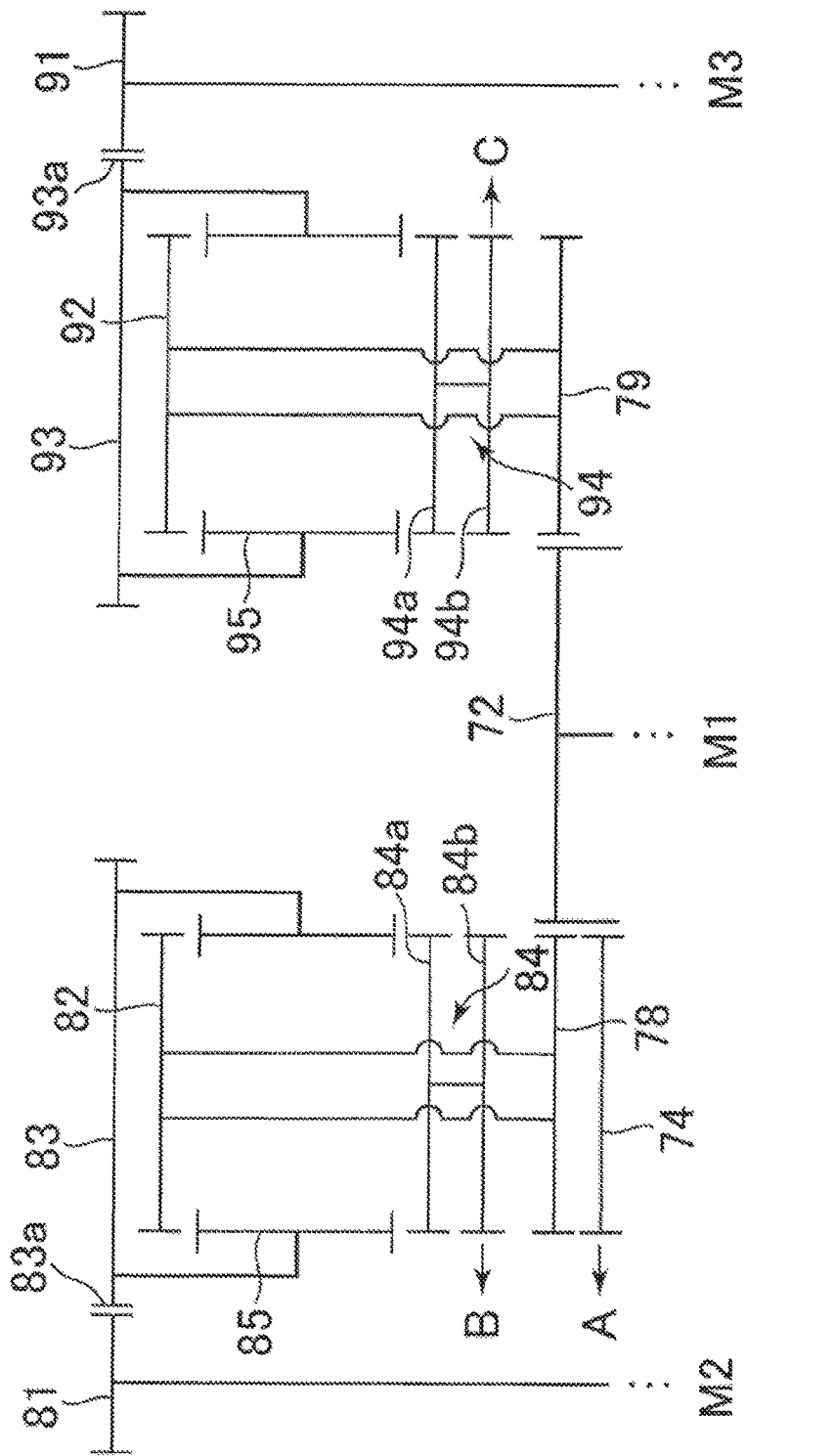
FIG. 3 is a skeleton view of a main part of the first embodiment of a differential device.

FIG. 3 is a schematic view illustrating an exemplary part of the above-described configuration of the differential device 70. With reference to FIG. 3, an operation of the differential device 70, in other words, a flow of torque transmission from each of the motors M1 to M3 to the face plate 20 and the pair of the ring gears 30, 40 will be described below.

First, while the motors M2 and M3 are not in operation, the first planetary carrier gear 83a and second planetary carrier gear 93a installed respectively on the first planetary carrier 83 and the second planetary carrier 93 are engaged respectively with the M2 input gear 81 and the M3 input gear 91 to which torque is transmitted respectively from the motors M2 and M3. Due to such engagement, the first planetary carrier 83 and the second planetary carrier 93 are fixed unrotatably. If only the motor M1 is driven in this state, torque is transmitted in the directions of Arrows A, B, C in the following way.

First, torque output in the direction of Arrow A is transmitted from the main gear 72, via the main torque output gear 74 engaged therewith and finally via the face plate gear 22 (see FIG. 4(a)), to the face plate 20.

On the other hand, due to rotation of the main gear 72, the torque is transmitted also to the first sub-torque input gear 78. Since the first sub-torque input gear 78 and the first sub-gear 82 are arranged so as to interlock with each other at a same speed in a same rotational direction, torque transmitted to the first sub-torque input gear 78 is transmitted to the first sub-gear 82. When the first sub-gear 82 rotates, the first planetary gear 85 auto-rotates (rotates on a shaft of itself) to transmit torque to the first input bevel gear 84(a). At this time, as the first planetary carrier 83 is fixed unrotatably as described above, the first planetary gear 85 does not revolve. And, as the first input bevel gear 84(*a*) and the first output spur gear 84(*b*) are arranged so as to interlock with each other at a same speed in a same rotational direction, torque is output in the direction of Arrow B. Since a mechanism as to how to output torque in the direction of Arrow C is symmetrical to that in the direction of Arrow B, a description of the former is omitted here. In this manner, the torque output in the directions of Arrows B, C is finally transmitted respectively to the first ring gear 30 and the second ring gear 40, respectively via the first outer peripheral gear 32 and the second outer peripheral gear 42 (see FIG. 4(*a*)).

As described above, the face plate 20, the first ring gear 30 and the second ring gear 40 can be rotated by stopping the motors M2 and M3 and driving only the motor M1. At this time, the number of gears and each gear ratio should be set so that the face plate 20, the first ring gear 30 and the second ring gear 40 rotate at a same speed and in a same rotational direction. It is because if the first ring gear 30 or the second ring gear 40 rotates at a different rotational speed with respect to the face plate 20, as will be described below, the first power transmission output gear 54 or the second power transmission output gear 64 rotates, and accordingly the tool holder 110 (see FIG. 5) moves in the axial or radial direction of the pipe.

Driving of the motor M2 or M3 from the state of the motors M2 and M3 being not in operation and only the motor M1 being driven can rotate the first ring gear 30 and the second ring gear 40 at the different rotational speed with respect to the face plate 20, as will be described below. Incidentally, since operations pertaining to driving of the motor M3 and driving of the motor M2 are symmetrical to each other, only the latter will be described while the former is omitted.

On one hand, when the motor M2 is driven, from the state of the first planetary carrier 83 being fixed and the motor M1 being driven at a constant speed, to rotate the planetary carrier 83 in the reverse direction to the rotational direction of the first sub-gear 82, the first planetary gear 85 revolves relatively with respect to the rotation of the first sub-gear 82, whereby auto-rotation speed of the first planetary gear 85 rises. Along with such rise in auto-rotational speed, rotational speed of the first input bevel gear 84(*a*) also rises, and consequently, rotational speed of the first input bevel gear 84(*a*) rises more than rotational speed of the main gear 72, thus enabling rotational speed of the second ring gear 40 to rise with respect to rotational speed of the face plate 20.

On the other hand, when the motor M2 is driven, from the state of the first planetary carrier 83 being fixed and the motor M1 being driven at the constant speed, to rotate the planetary carrier 83 in the same direction as the rotational direction of the first sub-gear 82, the first planetary gear 85 revolves in the same direction as the rotational direction of the first sub-gear 82, whereby auto-rotational speed of the first planetary gear 85 decreases. Along with such decrease in auto-rotational speed, the rotational speed of the first input bevel gear 84(*a*) also decreases, and consequently, the rotational speed of the first input bevel gear 84(*a*) decreases more than the rotational speed of the main gear 72, thus enabling the rotational speed of the second ring gear 40 to decrease with respect to the rotational speed of the face plate 20. In addition, if the rotational speed of the first planetary carrier 83 in the same direction rises more, the rotation of the first input bevel gear 84(*a*) can stop or reverse. Besides, while the above description covers, for convenience sake, the state of the motor M1 being driven at the constant speed, it naturally applies to a state of the motor M1 being driven not at a constant speed.

In this manner, according to the present disclosure, driving of only the motor M1 can infallibly rotate the face plate 20, the first ring gear 30 and the second ring gear 40 at an equal speed in a same direction, and from this state, control of the motors M2, M3 can freely control the rotational speeds of the first ring gear 30 and the second ring gear 40.

Next, with reference to FIGS. 4(*a*) and 4(*b*), mechanisms how to rotate the first power transmission output gear 54 and the second power transmission output gear 64 will be described below.

As shown in FIG. 4(*a*), the first power transmission output gear 54 exposed from a surface of the face plate 20 is installed to a first power transmission shaft 50. The first power transmission shaft 50 is rotatably supported inside the face plate 20. The first power transmission shaft 50 includes a first power transmission input gear 52 engaged with a first inner peripheral gear 34 provided on an inner periphery of the first ring gear 30.

Being rotatably supported to the face plate 20, the first transmission shaft 50 rotates around rotating shafts of the face plate 20 and the first ring gear 30 when the face plate 20 and the first ring gear 30 rotate at the same speed in the same direction. At this time, the first power transmission shaft 50 does not auto-rotate.

On one hand, when the rotational speed of the first ring gear 30 is higher than the rotational speed of the face plate 20, torque is transmitted from the first inner peripheral gear 34, via the first power transmission input gear 52, to the first transmission shaft 50, whereby the first power transmission shaft 50 auto-rotates in one direction. On the other hand, when the rotational speed of the first ring gear 30 is lower than the rotational speed of the face plate 20, torque is also transmitted from the first inner peripheral gear 34, via the first power transmission input gear 52, to first power transmission shaft 50, whereby, however, the first power transmission shaft 50 auto-rotates in another direction. In other words, the power transmission shaft 50 auto-rotates to either one of the directions when a difference in rotational speed occurs between the face plate 20 and the ring gear 40, thereby transmitting torque to the first power transmission output gear 54.

A mechanism how to rotate the second power transmission output gear 64 exposed from the surface of the face plate 20 is basically same as that of the first power transmission output gear 54. A description of the former is omitted here as the difference from the latter lies in that the second power transmission input gear 62 installed to the second power transmission shaft 60 is in engagement with the second inner peripheral gear 44 installed on an inner periphery of the second ring gear 40.

Figure 5:
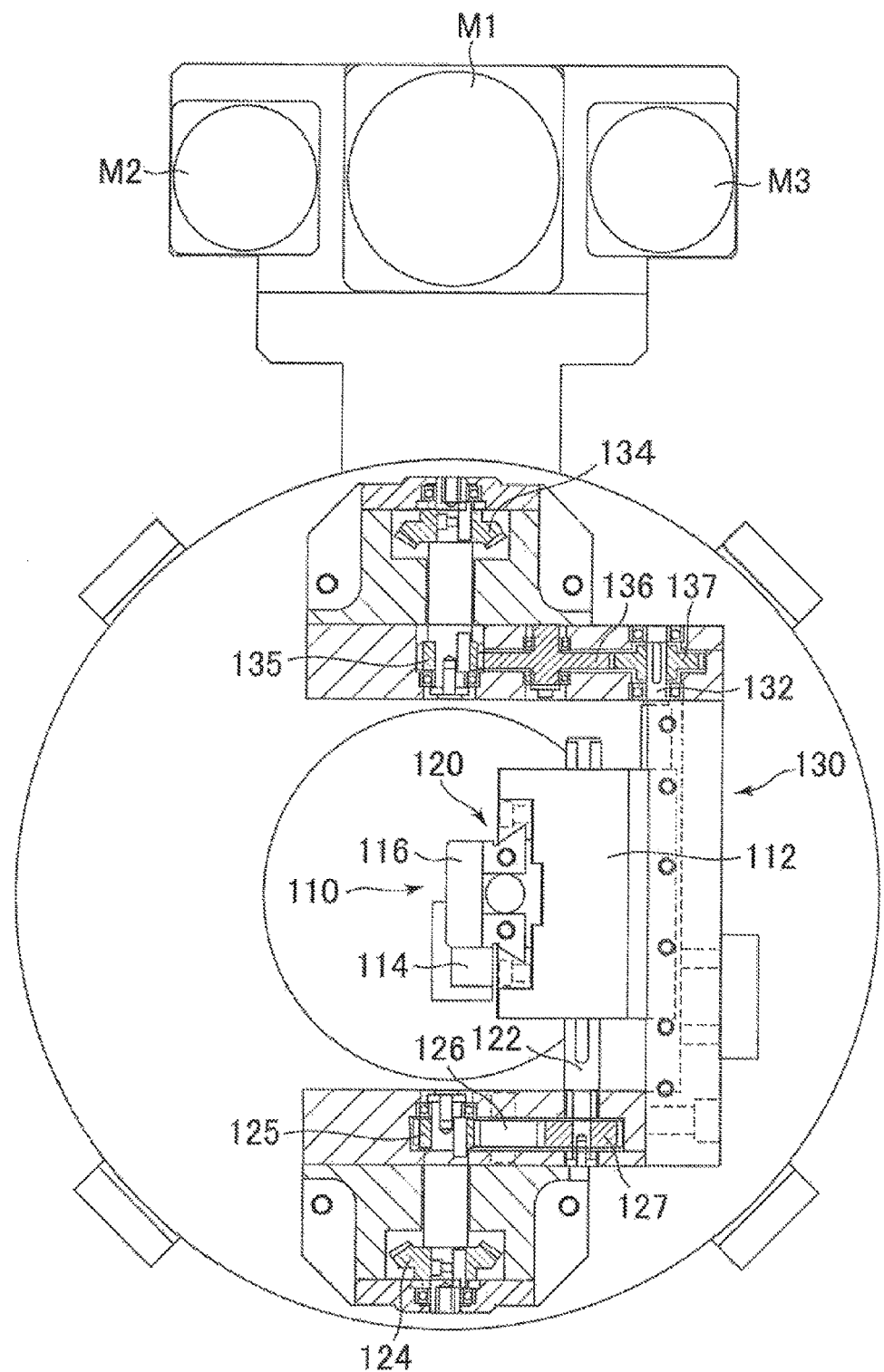
FIG. 5 is a partial longitudinal sectional view viewed from the front illustrating the first embodiment equipped with the tool holder.

Next, an operation pertaining to the tool holder 110 of the machining apparatus 10 will be described with reference to FIGS. 5 to 7. The tool holder 110 is installed to an axial movement mechanism 120, which serves as a first torque using means, and an axial movement mechanism 120 is installed to a radial movement mechanism 130, which serves as a second torque using means. In the following, a type of tool holder 110 for inserting a tool (cutting tool) 114 inside the pipe and then making edge preparation will be described. However, a description of a type of tool holder for applying the tool to an outside of the pipe to be cut will be omitted as the present disclosure is naturally applicable to such type, and how the tool 114 abuts on and machines the pipe is similar to the prior art.

The first power transmission output gear 54 (see FIG. 1(*a*)) is configured to engage with a radial movement input gear 134. Torque transmitted to the radial movement input gear 134 is transmitted to a rotating shaft for radial movement 132 via radial movement output gears 135, 136, 137.

On the other hand, the second power transmission output gear 64 (see FIG. 1(*a*)) is configured to engage with an axial movement input gear 124. Torque transmitted to the axial movement input gear 124 is transmitted, via axial movement output gears 125, 126, 127, to a first rotating shaft for axial movement 122.

Figure 6:
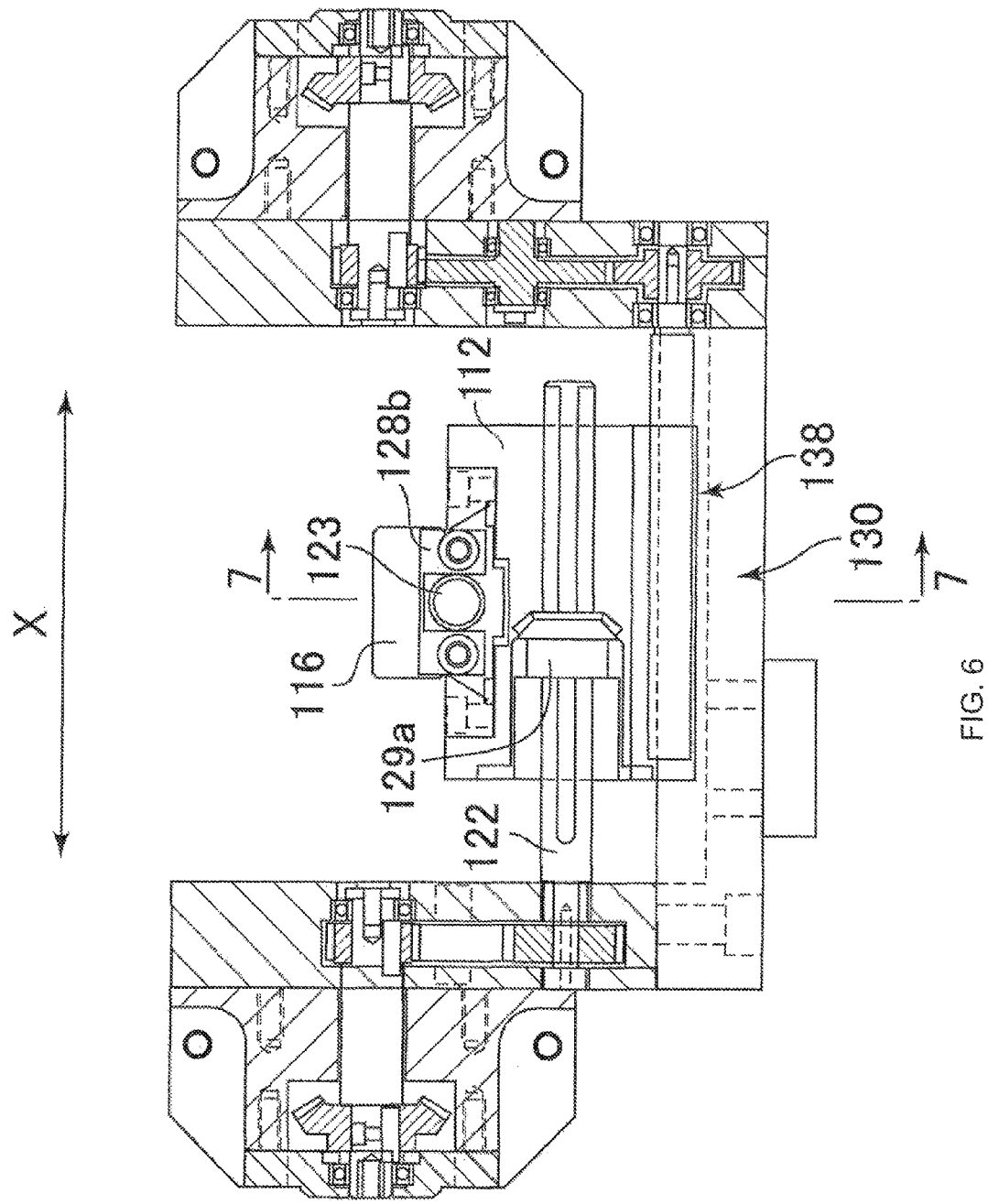
FIG. 6 is a longitudinal sectional view viewed from the front illustrating the tool holder of the first embodiment.

As shown in FIG. 6, the torque transmitted to the rotating shaft for radial movement 132 is converted into a linear motion by a linear motion conversion mechanism 138 such as a screw feed mechanism. Such linear motion can move a tool holder housing 112 coupled to the linear motion conversion mechanism 138 in the direction of Arrow X (radial direction of the face plate 20). Here, since an input bevel gear for axial movement 129*a* is spline-fitted on the first rotating shaft for axial movement 122, the input bevel gear for axial movement 129*a* moves on the first rotating shaft for axial movement 122 along with a movement of the tool holder housing 112.

Figure 7:
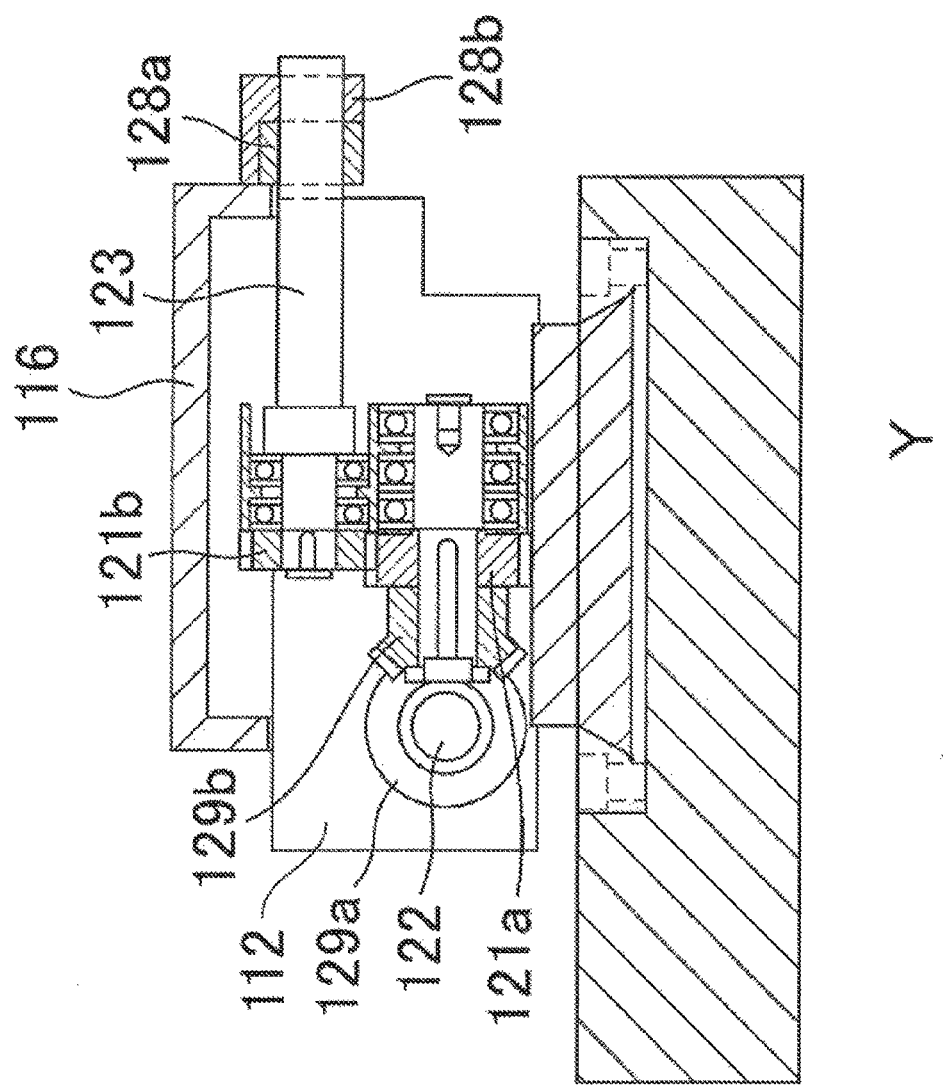
FIG. 7 is a cross-sectional view taken along the line 7-7 in FIG. 6.

The torque transmitted to the first rotating shaft for axial movement 122 is transmitted to the input bevel gear for axial movement 129*a*, and then transmitted to a second rotating shaft for axial movement 123, as shown in FIG. 7, via an output bevel gear for axial movement 129*b* engaged with the input bevel gear for axial movement 129*a*, an input spur gear for axial movement 121(*a*) interlocking with the output bevel gear for axial movement 129*b* and an output spur gear for axial movement 121(*b*) engaged with the input spur gear for axial movement 121(*a*). Incidentally, the second rotating shaft for axial movement 123 includes an external thread, which is omitted in the figure.

A feed nut 128*a* is provided on the second rotating shaft for axial movement 123. The feed nut 128*a* moves on the second rotating shaft for axial movement 123 in the axial direction thereof due to rotation of the second rotating shaft for axial movement 123. Here, the feed nut 128*a* is sandwiched between a tool rest 116 and a nut tray 128*b* fixed to the tool rest 116. Consequently, due to the rotation of the second rotating shaft for axial movement 123, the tool rest 116 moves forward and backward in the direction Y (axial direction of the face plate 20).

As described above, the rotation of the first power transmission output gear 54 or the second power transmission output gear 64 can move the tool holder housing 112 and the tool rest 116 in the radial and axial directions of the face plate 20. In other words, control of the rotational speed and the rotational direction of the motors M2, M3 can move the tool 114 freely in the radial and axial directions of the face plate 20, thus allowing free control of moving and stopping, moving speed, moving distance in the axial and radial directions of the tool 114 with respect to the pipe.

In the above, the differential device 70 configured to be disposed on an outer diameter side of the housing 10 was described. In addition to such configuration, the differential device 70 may be disposed on an inner diameter side of the housing 10, although an illustration thereof is omitted in the figure. In this case, the machining apparatus should be configured to be fixed inside the pipe, and the face plate gear 22 should be configured to be installed on an inner periphery of the face plate 20, so that torque from the first and second free gears 84, 94 can be transmitted to the first and second inner peripheral gears 34, 44, and torque can be transmitted from the first and second outer peripheral gears 32, 42 to the first and second power transmission input gears 52, 62.

Figure 8:
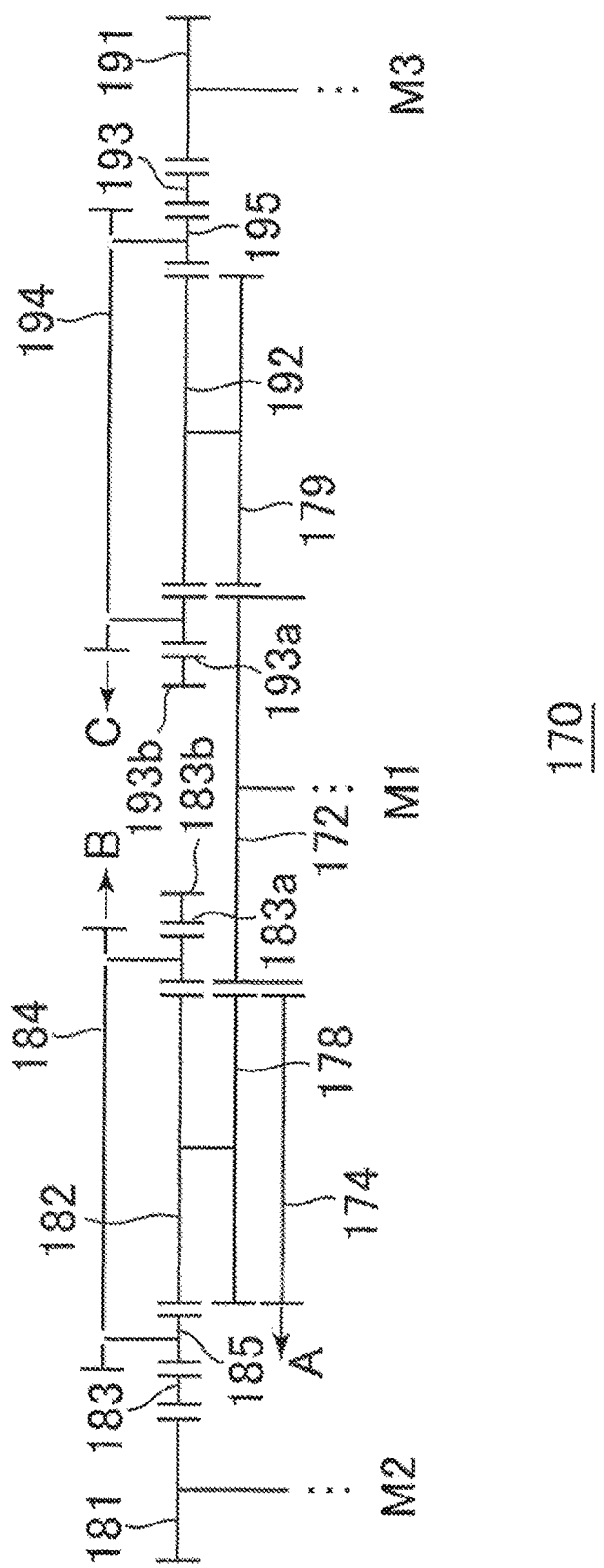
FIG. 8 is a skeleton view of a main part of the second embodiment of the differential device.

FIG. 8 is a schematic view illustrating an essential part of a configuration of a differential device 170 substitutable for the differential device 70. For convenience, the following description will pertain to the differential device 170 including three motors M1 to M3, a pair of sub-gears 182, 192, annular gears 183, 193, planetary gears 185, 195 and free gears 184, 194, and configured to output torque to three objects (Arrows A to C). However, a differential device may be, for instance, without the drive unit M3, the sub-gear 192, the annular gear 193, the planetary gear 195 and the free gear 194, so as to output torque to two objects (Arrows A, B).

On the contrary, a differential device may include additional drive units, additional sub-gears, additional annular gears, additional planetary gears and additional free gears so as to output torque to more objects. Further, the differential device 170 can be employed for various kinds of apparatuses such as welding equipment as well as for a machining apparatus, and a torque using means employed for these apparatuses is not limited to the axial movement mechanism 120 or the radial movement mechanism 130, which were described above. Incidentally, since the configuration that the differential device 170 is applied to a machining apparatus is similar to the configuration of the machining apparatus 100 except the differential device 70 thereof, only a configuration of the differential device 170 and a flow of torque transmission from each of the motors M1 to M3 to the face plate 20 and the pair of the ring gears 30, 40 will be described in the following.

The differential device 170 has a main gear 172 to which torque is transmitted from the motor M1. The main gear 172 is in engagement with a main torque output gear 174, a first sub-torque input gear 178 and a second sub-torque input gear 179. The first sub-torque input gear 178 and the second sub-torque input gear 179 are configured to interlock respectively with the first sub-gear 182 and the second sub-gear 192. The first free gear 184 and the second free gear 194 are rotatably installed coaxially with the first sub-gear 182 and the second sub-gear 192 respectively.

On the other hand, the first annular gear 183 and the second annular gear 193 are installed coaxially with the first sub-gear 182 and the second sub-gear 192 respectively. The first annular gear 183 and the second annular gear 193 have internal teeth 183*a*, 193*a* and external teeth 183*b*, 193*b* respectively. Between the internal teeth 183*a* of the first annular gear 183 and first sub-gear 182, a plurality of first planetary gears 185 engaged with the internal teeth 183*a* and the first sub-gear 182 are installed. Between the internal teeth 193*a* of the second annular gear 193 and the second sub-gear 192, a plurality of second planetary gears 195 engaged with the internal teeth 193*a* and the first sub-gear 192 are installed. While a single first planetary gear 185 and a single second planetary gear 195 function properly, the plurality thereof may be preferably provided from the viewpoint of strength. In this manner, the differential device 170 is configured to include a planetary gear mechanism composed of the first and second sub-gears 182, 192, the first and second annular gears 183, 193 and the first and second planetary gears 185, 195. Due to this configuration, the differential device 170 can be more compact in the axial direction of the first and second sub-gears 182, 192 in comparison with the differential device 70 using a bevel gear mechanism.

The first planetary gear 185 and the second planetary gear 195 are rotatably installed with respect to the first free gear 184 and the second free gear 194 respectively. This allows torque generated by revolutions of the first planetary gear 185 and the second planetary gear 195 to be transmitted each of the first free gear 184 and the second free gear 194.

The external teeth 183b of the first annular gear 183 and the external teeth 193b of the second annular gear 193 are in engagement respectively with an M2 input gear 181 and an M3 input gear 191 to which torque is transmitted respectively from the motors M2, M3. Due to such configuration, driving of the motors M2, M3 enables the first annular gear 183 and the second annular gear 193 to rotate separately around a shaft of the first sub-gear 182 or the second sub-gear 192.

Here, while the motors M2, M3 are not in operation, the external teeth 183b of the first annular gear 183 and the external teeth 193b of the second annular gear 193 are in engagement respectively with the M2 input gear 181 and the M3 input gear 191 to which torque is transmitted respectively from the motors M2, M3. Hence, the first annular gear 183 and the second annular gear 193 are fixed unrotatably. When only the motor M1 is driven in this state, torque is transmitted from Arrows A, B, C as follows.

First, torque of the main gear 172 is output in the direction of Arrow A from the main torque output gear 174 engaged with the main gear 172. Then, the torque in the direction of Arrow A is finally transmitted to the face plate 20.

On the other hand, due to rotation of the main gear 172, the torque is transmitted also to the first sub-torque input gear 178. As the first sub-torque input gear 178 and the first sub-gear 182 are installed so as to interlock with each other at a same speed in a same rotational direction, the torque transmitted to the sub-torque input gear 178 is transmitted to the first sub-gear 182. When the first sub-gear 182 rotates, the first planetary gear 185 revolves while auto-rotating and accordingly transmits torque generated by such revolution to the first free gear 184. Thus, the torque is output in the direction of Arrow B. As a mechanism as to how to output torque in the direction of Arrow C is symmetrical to that in the direction of Arrow B, a description of the former is omitted here. In this manner, the torque output in the directions of Arrows B, C is finally transmitted, via the first outer peripheral gear 32 and the second outer peripheral gear 42, respectively to the first ring gear 30 and the second ring gear 40 (see FIG. 4(a)).

As described above, by stopping the motors M2, M3 and driving the only motor M1, also the differential device 170 can rotate the face plate 20, the first ring gear 30 and the second ring gear 40. Meanwhile, in the differential device 170, since the revolution torque of the first and second planetary gears 185, 195 is transmitted to the first and second free gears 184, 194, torque from the main gear 172 is reduced to be transmitted. Therefore, a sufficient capacity of torque can be output from the first and second free gears 184, 194 by means of a drive unit (motor M1) that is more compact than a conventional one. Here, if the number of gears and each gear ratio are set so that face plate 20, the first ring gear 30 and the second ring gear 40 rotate at the same speed in the same rotational direction, and torque at an equal speed can be output from the main torque output gear 174 and the first and second free gears 184, 194, while the torque from the main gear 172 can be reduced.

Moreover, driving the motor M2 or M3 from the state of the motors M2 and M3 being not in operation and only the motor M1 being driven enables the first ring gear 30 and the second ring gear 40 to rotate at a different rotational speed with respect to the face plate 20, as will be described below. Incidentally, since operations pertaining to driving of the motor M3 and driving of the motor M2 are symmetrical to each other, only the operation of the latter will be described while the operation of the former is omitted here.

First, when the motor M2 is driven, from the state of the first annular gear 183 being fixed and the motor M1 being driven at a constant speed, to rotate the annular gear 183 in the direction opposite to the rotational direction of the first sub-gear 182, the rotation of the first annular gear 183 causes the first planetary gear 185 to revolve in the opposite direction, whereby the revolution speed of the first planetary gear 185 decreases. Along with such decrease, rotational speed of the first free gear 184 also decreases, and as a result, falls below that of the main gear 172. Thus, the rotational speed of the first ring gear 30 can be reduced with respect to the rotational speed of the face plate 20.

On the other hand, when the motor M2 is driven, from the state of the first annular gear 183 being fixed and the motor M1 being driven at a constant speed, to rotate the annular gear 183 in the same direction as the rotational direction of the first sub-gear 182, the rotation of the first annular gear 183 affects the first planetary gear 185 to revolve in the same direction as before, whereby the revolution speed of the first planetary gear 185 increases. Along with such increase, the rotational speed of the first free gear 184 also increases, and as a result, increases beyond that of the main gear 172. Thus, the rotational speed of the first ring gear 30 can be increased with respect to the rotational speed of the face plate 20. Besides, while the above description covers, for convenience sake, the state of the motor M1 being driven at a constant speed, it applies naturally to a state of the motor M1 being driven not at a constant speed.

In this manner, according to the differential device 170 also, driving of only the motor M1 can infallibly rotate the face plate 20, the first ring gear 30 and the second ring gear 40 at the equal speed in the same direction, and control of the motors M2, M3 from this state can freely control the rotational speeds of the first ring gear 30 and the second ring gear 40.

As described above, the differential device including the planetary gear mechanism of the present disclosure can output a sufficient capacity of torque from the free gear using a drive unit that is more compact than a conventional one. Also, such differential device, being compact, can output torque from two places, namely, the main gear and the free gear when one drive unit is driven. Additionally, from this state, if another drive unit is driven, the differential device can freely control the rotational speed of the free gear. Furthermore, the machining apparatus including such differential device can be more compact and use a small-sized drive unit in comparison with a conventional one.

According to the machining apparatus of the present disclosure, driving of only the motor M1 can rotate the face plate 20, the first ring gear 30 and the second ring gear 40 at the equal speed in the same direction. And from this state, driving of the motor M2 or M3 and control of the rotational direction and rotational speed thereof can freely rotate the first power transmission output gear 54 and the second power transmission output gear 64. Consequently, the tool 110 can be moved freely and accurately in the radial and axial directions.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A machining apparatus comprising:
a housing;
a face plate having a face plate gear and a ring gear, the face plate and the ring gear rotatably installed with respect the housing;
a transmission shaft rotatably supported to the face plate, the transmission shaft including:
a transmission input gear to which torque is transmitted from the ring gear; and
a transmission output gear for transmitting the torque from the transmission input gear;
a torque use means to which torque is transmitted from the transmission output gear; and
a differential device mounted to the housing,
wherein the differential device includes:
a first drive unit and a second drive unit;
a main gear to which torque is transmitted from the first drive unit;
a sub-gear that interlocks with the main gear;
an annular gear having internal teeth, the annular gear to which torque is transmitted from the second drive unit;
a planetary gear engaged with the sub-gear and the internal teeth of the annular gear, the planetary gear that revolves around the sub-gear and a shaft of the annular gear; and
a free gear to which revolution torque of the planetary gear is transmitted, and
wherein when the annular gear is fixed and the main gear rotates, the face plate and the ring gear rotate at an equal speed in a same direction.

2. The machining apparatus according to claim 1 further including:
another ring gear;
another transmission shaft corresponding to the ring gear;
another torque use means corresponding to the transmission shaft,
another sub-gear;
another annular gear;
another planetary gear;
another free gear; and
another drive unit whereby the drive units transmit torque to each of the annular gears.

3. The machining apparatus according to claim 2 further including a tool that is moved in an axial direction and a radial direction of the face plate by means of an axial movement mechanism and a radial movement mechanism included by the torque use means.

4. The machining apparatus according to claim 1,
wherein the housing, the face plate and the ring gear are annular in shape, and
wherein the housing comprises a clamp so that the machining apparatus is fixed to an outer diameter side of a pipe serving as a workpiece.

5. A machining apparatus comprising:
an annular housing;
an annular face plate having a face plate gear and a pair of annular ring gears having an outer peripheral gear and an inner peripheral gear, the annular face plate and the pair of the annular ring gears rotatably provided with respect the housing;
a clamp mounted to the housing for fixing the housing and the ring gears to an outer diameter side of a pipe serving as a work-piece;
a first transmission shaft rotatably supported to the face plate, the first transmission shaft including:
a first transmission input gear to which torque is transmitted from one of the ring gears; and
a first transmission output gear for transmitting the torque from the first transmission input gear;
a second transmission shaft rotatably supported to the face plate, the second transmission shaft comprising:
a second transmission input gear to which torque is transmitted from another of the ring gears; and
a second transmission output gear for transmitting the torque from the second transmission input gear;
a radial movement mechanism for converting torque of the first transmission output gear into a linear movement in a radial direction of the face plate;
an axial movement mechanism for converting torque of the second transmission output gear into a linear movement in an axial direction of the face plate;
a tool holder coupled to the axial movement mechanism and mounted on a face plate side thereof;
a first drive unit for transmitting torque to the face plate;
a second drive unit for transmitting torque to the one of the pair of the ring gears; and
a third drive unit for transmitting torque to the other of the pair of the ring gears.

6. The machining apparatus according to claim 5 further including a differential device to which the first to third drive units are installed,
wherein the differential device mounted to the housing, the differential device includes:
a main gear to which torque is transmitted from the first drive unit and a pair of sub-gears that interlocks with the main gear; and
a pair of free gears respectively corresponding to the pair of the sub-gears;
one planetary carrier to which torque is transmitted from the second drive unit;
another planetary carrier to which torque is transmitted from third second drive unit; and
planetary gears provided respectively to the pair of the planetary carriers and engaged with the sub-gear and the free gear, the planetary gears that revolve around the sub-gear and a shaft of the free gear;
wherein torque from the main gear is transmitted to the face plate gear,
wherein torque from the pair of the free gears is respectively transmitted to the pair of the ring gears, and
wherein when the pair of the planetary gears are fixed and the main gear rotates, torque at an equal speed in a same rotational direction is transmitted to the face plate and the pair of the ring gears.

7. The machining apparatus according to claim 5 further including a differential device to which the first to third drive units are installed,
wherein the differential device mounted to the housing, the differential device includes:
a main gear to which torque is transmitted from the first drive unit and a pair of sub-gears that interlocks with the main gear;
one annular gear to which torque is transmitted from the second drive unit, the one annular gear comprising internal teeth;
another annular gear to which torque is transmitted from the third drive unit, the other annular gear comprising internal teeth;

one planetary gear engaged with the one sub-gear and the internal teeth of the one annular gear, the one planetary gear that revolves around the one sub-gear and a shaft of the one annular gear;

another planetary gear engaged with the other sub-gear and the internal teeth of the other annular gear, the other planetary gear that revolves around the other sub-gear and a shaft of the other annular gear;

one free gear to which revolution torque of the one planetary gear is transmitted; and another free gear to which revolution torque of the other planetary gear is transmitted;

wherein torque from the main gear is transmitted to the face plate, wherein torque from the pair of the free gears is transmitted respectively to the pair of the ring gears, and wherein when the pair of the annular gears are fixed and the main gear rotates, torque at an equal speed in a same rotational direction is transmitted to the face plate and the pair of the ring gears.

8. The machining apparatus according to claim 5, wherein the face plate is rotatably supported to the housing, and wherein the pair of the ring gears are relatively rotatably installed with respect to the face plate.

9. The machining apparatus according to claim 2, wherein the housing, the face plate and the ring gear are annular in shape, and wherein the housing comprises a clamp so that the machining apparatus is fixed to an outer diameter side of a pipe serving as a workpiece.

10. The machining apparatus according to claim 3, wherein the housing, the face plate and the ring gear are annular in shape, and wherein the housing comprises a clamp so that the machining apparatus is fixed to an outer diameter side of a pipe serving as a workpiece.

11. The machining apparatus according to claim 6, wherein the face plate is rotatably supported to the housing, and wherein the pair of the ring gears are relatively rotatably installed with respect to the face plate.

12. The machining apparatus according to claim 7, wherein the face plate is rotatably supported to the housing, and wherein the pair of the ring gears are relatively rotatably installed with respect to the face plate.

* * * * *